UNITED STATES PATENT OFFICE

OTTO E. BROWNELL, OF DES MOINES, IOWA

PROCESS FOR PRODUCING HEAT-INSULATING AND SOUND-DEADENING FILLER FOR BUILDING STRUCTURES

No Drawing.   Application filed November 2, 1926.   Serial No. 145,856.

This invention relates to improvements in building structures, and particularly to the wall and ceiling construction.

The object of my invention is to provide an improved process for making building composition having heat insulating and sound deadening properties.

My invention consists in the construction, arrangement and combination of the various parts of the device, whereby the objects contemplated are attained, as hereinafter more fully set forth, and pointed out in my claims.

The process consists in mixing ashes of rice hulls and a small percent of powdered gypsum, together with such quantity of water as to form what is commonly known as a dry mix. This mixture is permitted to partially set, and is then agitated by shoveling or any other desired method, to cause the mixture to set in small granules. This mixture, while still in a damp condition, is delivered into the space between the sheeting and the first coat of plaster. This mixture I shall term a filler. It will be seen that if the filler is shoveled loosely into the dead air space a very loose and porous substance will be provided which will greatly increase the heat insulating and sound deadening properties of the wall.

Thus it will be seen that I have provided an improved filler in which the heat insulating and sound deadening properties are very highly developed on account of the looseness and porousness of said filler.

The ashes of rice hulls could be used for a filler by placing them in the air space between the sheeting and first coat with very good results. It is desirable, however, to mix a small quantity of gypsum or other binder with the ashes to form larger granules to prevent the mixture from leaking through cracks in the frame construction, as the ashes of rice hulls are very fine.

Thus it will be seen that I have provided a simple, durable and inexpensive filler for building structures in which the heat insulating and sound deadening and water-proof properties are very high, and at the same time providing a filler of light weight.

I claim as my invention:

1. The process of making heat insulating and sound deadening filler for building structures consisting in the mixing of ashes of rice hulls and powdered gypsum with water to form a dry mix, said mixture being permitted to partially set, then agitating it so that it is broken up to form a loose and granular mass.

2. The process of making heat insulating and sound deadening filler for building structures consisting in the mixing of ashes of rice hulls and powdered gypsum with water to form a dry mix, said mixture being permitted to partially set, then agitating it so that it is broken up to form a loose and granular mass and then inserting it in a damp condition into a building structure.

Des Moines, Iowa, October 15, 1926.

OTTO E. BROWNELL.